United States Patent [19]

Morscheck

[11] 4,329,885
[45] May 18, 1982

[54] POWERSHIFT SYNCHRONIZED TRANSMISSION

[75] Inventor: Timothy J. Morscheck, Lathrup Village, Mich.

[73] Assignee: Eaton Corporation, Cleveland, Ohio

[21] Appl. No.: 973,271

[22] Filed: Dec. 26, 1978

[51] Int. Cl.³ .......................... F16H 3/38; F16H 3/08
[52] U.S. Cl. ........................................ 74/339; 74/357; 74/359; 74/360
[58] Field of Search ................. 74/357, 358, 359, 339, 74/360, 361

[56] References Cited

U.S. PATENT DOCUMENTS

| | | | |
|---|---|---|---|
| Re. 29,601 | 4/1978 | Richards | 74/339 |
| 850,901 | 4/1907 | Bramley-Moore | 74/359 |
| 1,064,889 | 6/1913 | Deves | 74/359 |
| 1,195,206 | 8/1916 | Goodspeed | 74/357 X |
| 1,284,057 | 11/1918 | Campadonico | 74/339 X |
| 2,186,653 | 1/1940 | Penote | 74/470 |
| 2,222,144 | 11/1940 | Ferris | 74/733 |
| 2,501,286 | 3/1950 | Mirossay | 74/346 |
| 2,612,787 | 10/1952 | Youngren et al. | 74/359 X |
| 2,723,735 | 11/1955 | Banker | 192/3.2 |
| 2,761,325 | 9/1956 | Short | 74/339 |
| 2,897,690 | 8/1959 | Maier | 74/732 X |
| 2,923,389 | 2/1960 | Perkins | 74/339 X |
| 2,949,047 | 8/1960 | Burckhardt | 74/732 |
| 2,978,083 | 4/1961 | Henyon | 192/114 |
| 3,110,197 | 11/1963 | Prakash | 74/677 |
| 3,202,005 | 8/1965 | Ivonchich | 74/359 X |
| 3,387,506 | 6/1968 | Cadion | 74/359 X |
| 3,478,851 | 11/1969 | Smyth et al. | 192/3.5 |
| 3,557,635 | 1/1971 | Tuck | 74/677 |
| 3,589,483 | 6/1971 | Smith | 74/681 |
| 3,983,979 | 10/1976 | Richards | 74/339 X |
| 4,060,005 | 11/1977 | Bost | 74/536 X |

FOREIGN PATENT DOCUMENTS

| | | | |
|---|---|---|---|
| 923402 | 7/1949 | Fed. Rep. of Germany | 74/359 |
| 498524 | 1/1920 | France | 74/359 |
| 586463 | 3/1925 | France | 74/359 |
| 459341 | 1/1936 | United Kingdom | 74/357 |
| 569356 | 5/1945 | United Kingdom | 74/359 |
| 1417507 | 12/1975 | United Kingdom | 74/357 |

Primary Examiner—Leslie Braun
Attorney, Agent, or Firm—R. J. McCloskey; P. Rulon

[57] ABSTRACT

Disclosed is a power shift transmission having torque converter, an input shaft driven by the torque converter, a countershaft in continuous driving relation with the input shaft, an output shaft having first, second, and third speed ratios journaled thereon and driven via the countershaft, a reverse speed ratio gear splined to the output shaft and driven via a gear on an idler shaft driven by the countershaft, a first friction clutch mechanism for connecting the first speed ratio gear to the output shaft, a second friction clutch mechanism for connecting the output shaft directly to the input shaft, a blocker-clutch assembly for coupling the second and third speed ratio gears to the output shaft, and an actuator assembly for shifting the blocker-clutch assembly into and out of coupling engagement. The friction clutches are momentarily engageable to relieve driving and coast mode torque on the blocker-clutch and to synchronize the blocker-clutch. An alternative embodiment of the transmission includes a torque converter driven shaft for driving the countershaft and a torque converter bypass shaft which is connected directly to the output shaft via the second friction clutch mechanism.

10 Claims, 6 Drawing Figures

POWERSHIFT SYNCHRONIZED TRANSMISSION

CROSS-REFERENCE TO RELATED APPLICATIONS

This application is related to copending U.S. applications Ser. Nos. 973,262, filed Dec. 26, 1978; 973,266, filed Dec. 26, 1978; 973,267, filed Dec. 26, 1978; and 973,270, filed Dec. 26, 1978. All of these applications are assigned to the assignee of this application.

FIELD OF THE INVENTION

This invention relates to transmissions and, more specifically, to transmissions which are powershifted and synchronized.

BACKGROUND OF THE INVENTION

It is known in the art to selectively engage and disengage positive or jaw type clutches to shift a transmission from one speed ratio to another. Positive clutches are preferred in transmissions since they are compact and inexpensive relative to friction clutches and are extremely reliable if they are synchronously engaged. Most of these transmissions are manually shifted and employ a manually operated friction clutch for disconnecting the transmission input shaft from a prime mover when shifting from one ratio to another. Such disconnecting by the friction clutch has the disadvantage of interrupting the driving connection between the prime mover and the load connected to the transmission output shaft. Further, when such transmissions are used in relatively heavy vehicles, the vehicle operator must perform a double clutching manipulation of the friction clutch when shifting from one ratio to another. When double clutching, the operator must momentarily disengage the friction clutch to relieve torque on the positive clutch to be disengaged, then momentarily reengage the friction clutch to synchronize the positive clutch to be engaged, and then momentarily disengage the friction clutch prior to engagement of the positive clutch to minimize shock loading. Further, when the friction clutch is momentarily reengaged, the vehicle operator must either increase or decrease the prime mover speed to bring the positive clutch to synchronism. If the operator is unskilled or if the vehicle is moving slowly and/or if the vehicle is on a steep grade, it is not uncommon for a shift to be missed or for the positive clutches to be abused due to asynchronous engagement.

Many attempts have been made to adapt the above type of transmissions to automatic or semiautomatic controls to negate the above problems. One such attempt, as disclosed in U.S. Pat. No. 3,589,483, proposes positive clutches for engaging the several speed ratios, a first friction clutch for connecting the several speed ratio gears to a prime mover, a second friction clutch for connecting the transmission output shaft directly to the prime mover and synchronizing the positive clutches during upshifting, and a semiautomatic control system for controlling the sequential operation of the friction and positive clutches when a shift control lever is moved from one ratio position to another. When the lever is moved in an upshift sense, the control automatically provides power upshifting and synchronizing by momentarily or partially disengaging the first friction clutch and by momentarily or partially engaging the second friction clutch. When the lever is moved in a downshift sense, the control automatically provides a partial power downshifting by manipulating engagement and disengagement of the friction clutches, but synchronizing must be provided by engine speed manipulation. During both upshifting and downshifting, the clutch teeth of the positive clutch to be engaged are moved into abutment with each other prior to synchronism therebetween, thereby exposing the positive clutches to asynchronous engagement.

SUMMARY OF THE INVENTION

An object of this invention is to provide a ratio change transmission employing both friction and positive type clutches to engage the different ratios and further employing the friction clutches when upshifting and downshifting into at least one positive clutch to maintain a driving connection through the transmission and to synchronize the positive clutch.

According to a feature of the invention, the transmission includes an input shaft and an output shaft and at least one countershaft and ratio change means operative to provide at least low, intermediate, and high speed ratio changes between the input and output shafts via the countershaft; the ratio change means includes a low and an intermediate speed ratio gear mounted for rotation about one of the shafts, first and second jaw clutch members operative when engaged to couple the intermediate gear to the one shaft and to provide the intermediate speed ratio, a first friction clutch fully engageable to couple the low gear to the one shaft and to provide the low speed ratio and momentarily engageable during downshifting into the intermediate speed ratio to synchronize the jaw clutch members, and a second friction clutch fully engageable to couple the input shaft directly to the output shaft to provide the high speed ratio and momentarily engageable during upshifting into the intermediate speed ratio to synchronize the jaw clutch members.

BRIEF DESCRIPTION OF THE DRAWINGS

The transmission of the instant invention is shown in the accompanying drawings in which:

FIGS. 4A and 4B are detailed views of a portion of a blocker-clutch in FIG. 4;

DETAILED DESCRIPTION OF THE DRAWINGS

Figure 1:
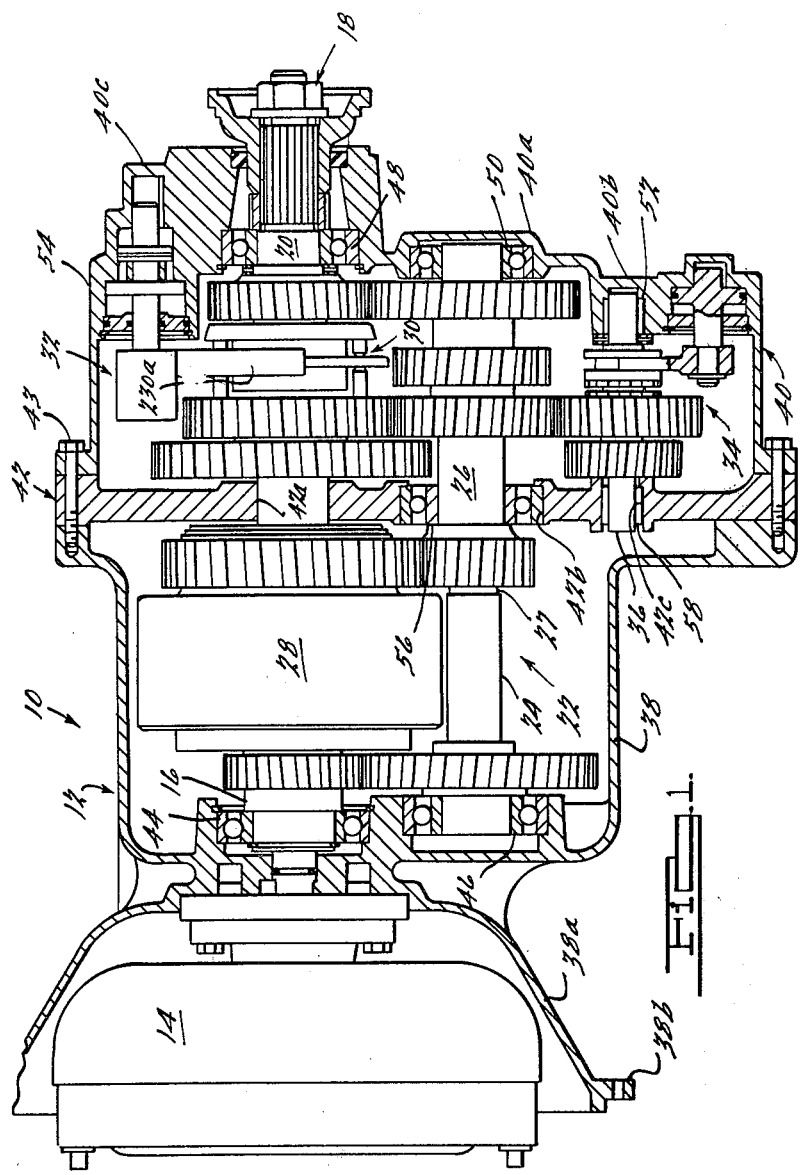
FIG. 1 is a partially sectioned view of the transmission, looking along line 1—1 of FIG. 2.
Figure 2:
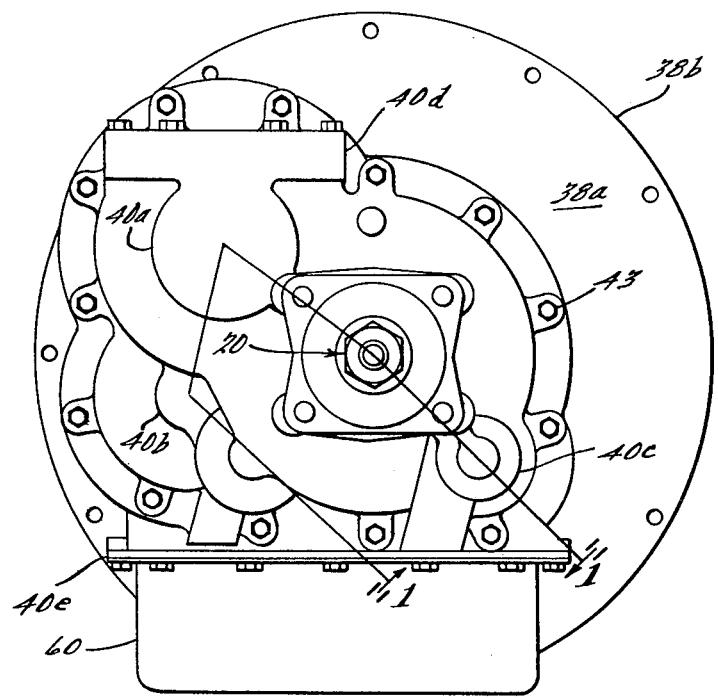
FIG. 2 is an end view of the rear housing member of the transmission.

Looking now at FIGS. 1 and 2 and in particular FIG. 1, therein is shown a powershift transmission 10, partially sectioned along line 1—1 of FIG. 2. The transmission is intended for use in a land vehicle but is not limited to such use. The transmission is preferably automatically shifted by an unshown control system which forms no part of the instant invention. The transmission includes a housing assembly 12, a fluid coupling or torque converter assembly 14 which may be directly driven by an unshown internal combustion engine, an input shaft 16, an output shaft assembly 18 including an output shaft 20, at least one countershaft assembly 22 including countershaft members 24 and 26 splined together at 27, a friction clutch assembly 28, a blocker-clutch assembly 30, an actuator assembly 32, and a reverse gear assembly 34 including an idler shaft 36.

In describing transmission 10, its leftward portion, as shown in FIG. 1, will be referred to as the front and its rightward portion will be referred to as the rear.

Housing assembly 12 includes a front housing member 38, having a bell housing portion 38a integrally formed therewith, a rear housing member 40, and an intermediate plate member 42. Members 38, 40, and 42 are secured together via a plurality of bolts 43. A flange portion 38b of bell housing 38a provides means for securing the transmission to the rear of an unshown engine. The front housing member carries bearings 44 and 46 for rotatably supporting input shaft 16 and countershaft 24. The rear housing member carries bearings 48, 50, and 52 for rotatably supporting output shaft 20, countershaft 26, and idler shaft 36. Looking at both FIGS. 1 and 2, the true position of countershaft 26, idler shaft 36, and actuator assembly 30, relative to output shaft 20, may be gleaned from the position of bosses 40a and 40b which carry bearings 50 and 52 and from a boss 40c which defines a portion of a cylinder housing 54 of the actuator assembly 32. Intermediate plate 42 includes a through bore 42a for the passage of output shaft 20 and through bores 42b and 42c which carry bearings 56 and 58 for rotatably supporting countershaft 26 and idler shaft 36. Rear housing member 40 further includes a power takeoff pad 40d and a flange 40e for the attachment of an oil pan 60, shown only in FIG. 2.

Figure 3:
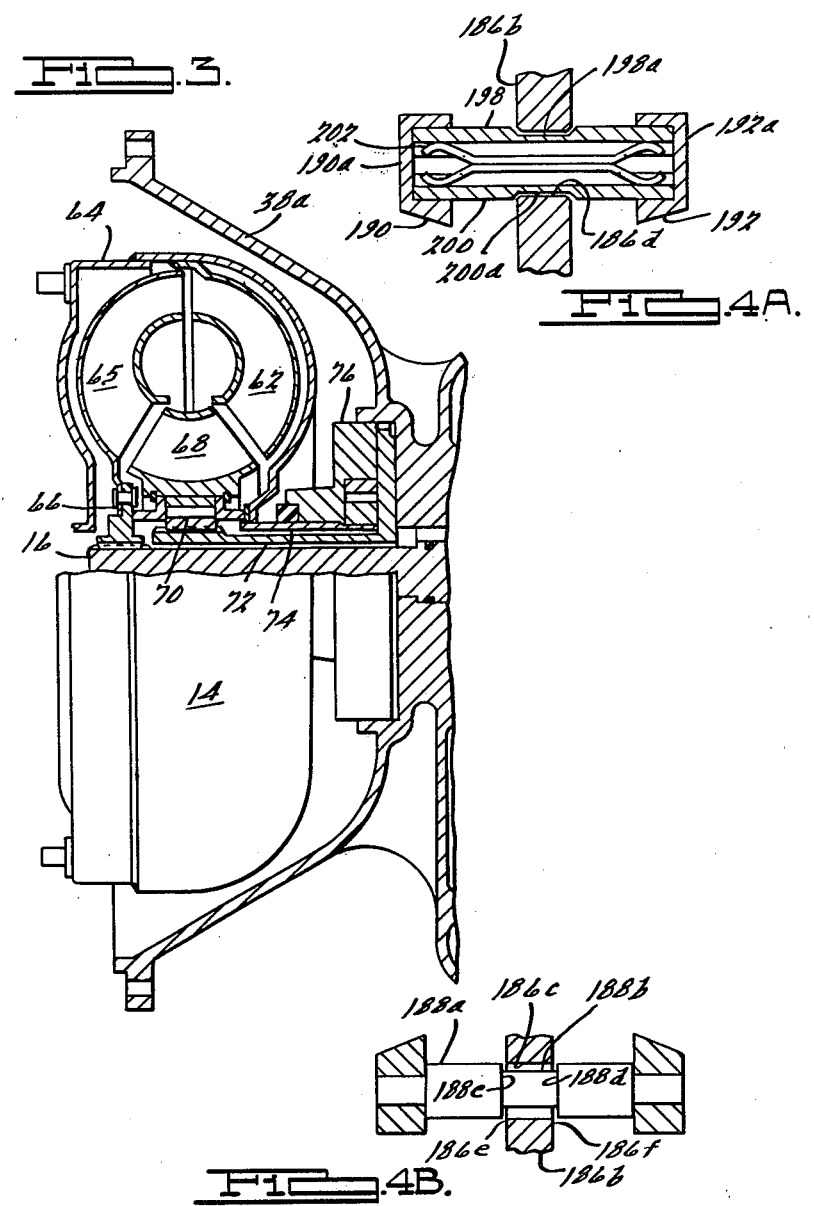
FIG. 3 is a partially sectioned view of a torque converter shown in FIG. 1.

Looking now at FIGS. 1 and 3 and in particular FIG. 3, torque converter assembly 14 includes an impeller 62 driven by a shroud 64, a turbine 65 hydraulically driven by the impeller and in turn drivingly fixed to input shaft 16 at 66, and a runner or stator 68 which becomes grounded to housing member 38 via a one-way roller clutch 70 carried by a sleeve 72 fixed to the housing member. The rear side of shroud 64 is fixed to a sleeve 74 which rotatably supports the rear of the shroud and drives a pump 76. Pump 76 may be a well known crescent gear pump for pressurizing the torque converter, for lubricating the transmission, and for providing pressurized fluid to engage friction clutches and actuators in the transmission.

Figure 4:
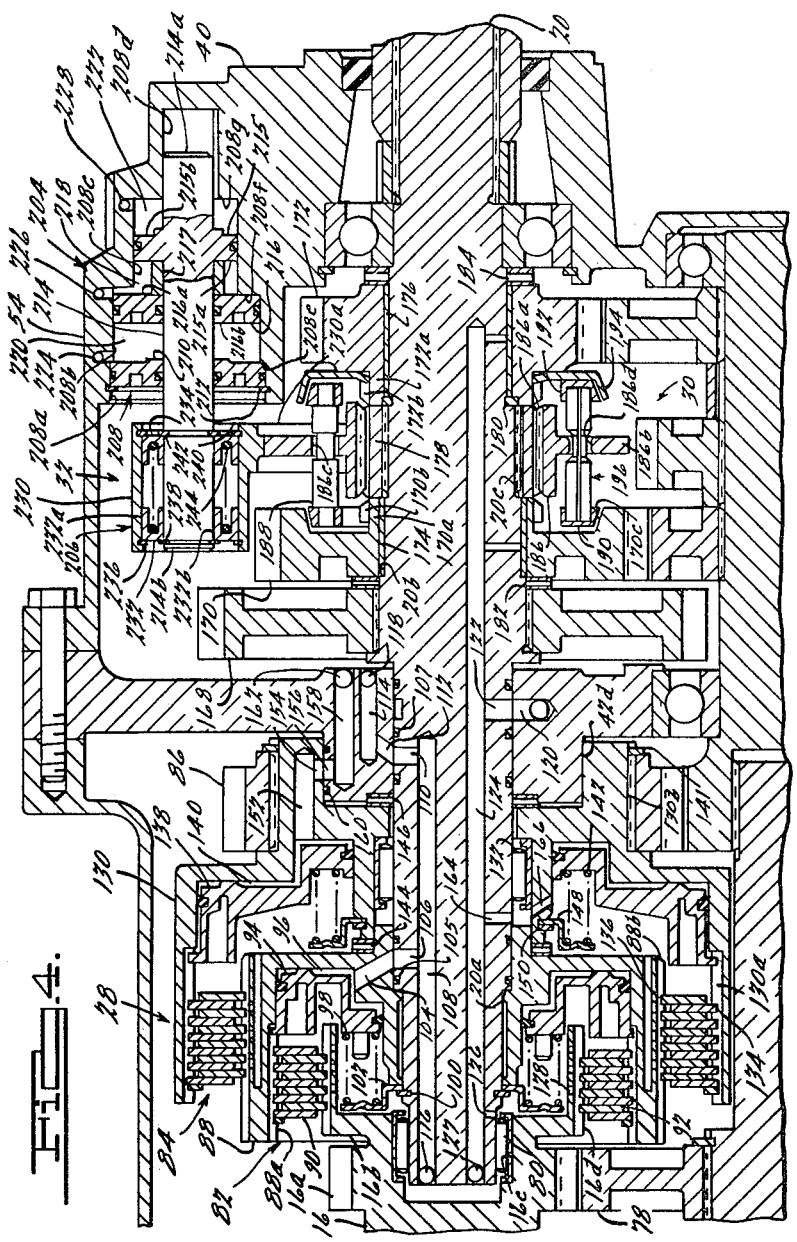
FIG. 4 is a fully sectioned view of a portion of the transmission ratio gearing, clutches, and an actuator.

Looking now at FIGS. 1 and 4 and in particular FIG. 4, input shaft 16 is integrally formed with an input gear 16a which is in constant mesh with a countershaft gear 78, an annular flange 16b for connecting the input shaft to friction clutch assembly 28, and a recess 16c carrying a bearing 80 for rotatably supporting the front end of output shaft 20. Friction clutch assembly 28 includes a clutch mechanism 82 for connecting the input shaft directly to the output shaft and a clutch mechanism 84 for connecting a low or first speed ratio gear 86, driven by the countershaft, to the output shaft.

Clutch mechanism 82 includes a housing member 88 splined to shaft 20, a set of friction disks 90 slideably splined to internal splines 88a defined by member 88, a set of friction disks 92 slideably splined to external splines 16d defined by annular flange 16b, a piston 94 for squeezing the disks together in response to pressurized fluid being introduced into a chamber 96 defined by housing member 88 and piston 94, and a set of return springs 98 for retracting the piston. Housing member 88 is axially retained by a shoulder 20a defined by a step in shaft 20 and a snap ring 100 which also retains a radially extending flange 102 having springs 98 reacting thereagainst. Pressurized oil for actuating clutch 82 is introduced into chamber 96 via a passage 104 in housing 88, passages 106, 108, and 110 in shaft 20, and passages 112 and 114 in intermediate plate 42 and in an annular rim portion 42d which extends the axial interface of bore 42a with shaft 20. Passage 114 is connected to an unshown control system which is selectively operative to provide the pressurized oil. Passages 108 and 114 are sealed at their forward and rearward ends, respectively, by interference fit balls 116 and 118. Passages 104 and 106 are sealed at their respective interface with member 88 and bore 42a via pairs of seals 105 and 107. Oil for lubricating bearing 80 and the disks of clutch 82 flows through a passage 120 in intermediate plate 42, passages 122, 124, and 126 in shaft 20, and a plurality of passages 128 in flange 16b. Passage 124 is sealed at its forward end by an interference fit ball 127.

Clutch mechanism 84 includes a housing member 130 rotatably supported on shaft 20 via a bearing 132, a set of friction disks 134 slideably splined to internal splines 130a defined by member 130, a set of disks 136 slideably splined to external splines 88b defined by housing member 88, a piston 138 for squeezing the disks together in response to pressurized oil being introduced into a chamber 140 defined by housing member 130 and piston 138, a set of return springs 142 for retracting the piston, and a hub portion 130b defined by housing member 130. Low ratio gear 86 is splined to hub portion 130b and axially retained thereon by a snap ring 141. Housing member 130 is axially retained for rotation relative to housing member 88 and rim portion 42d via thrust bearings 144 and 146. Springs 142 react against a radially extending flange 148 secured to member 130 via a snap ring 150. Pressurized oil for actuating clutch 84 is introduced into chamber 140 via passages 152 and 154 in hub portion 130b and passages 156 and 158 in rim portion 42d and intermediate plate 42. Passage 156 is sealed at its interface with hub portion 130b via a pair of seals 160. Passage 158 is sealed at its rearward end by an interference fit ball 162. Oil for lubricating bearings 132, 144, and 146 and the disks of clutch mechanism 84 flows through passages 124, 164, and 166. Passage 158 is connected to the unshown control system which is selectively operative to provide the pressurized oil.

Looking now in the area of blocker-clutch mechanism 30, therein are three gears, a reverse speed ratio gear 168 splined to shaft 20 and retained against forward movement by a shoulder 20b and first and second intermediate speed ratio gears 170 and 172 supported for rotation on shaft 20 by sleeve bearings 174 and 176. Gears 170 and 172 each include an axially extending sleeve portion or jaw clutch member 170a and 172a which each have external jaw clutch splines 170b and 172b. Gears 170 and 172 are axially spaced apart by a sleeve 178 splined on its I.D. to shaft 20 and retained against axial movement by a shoulder 20c and a snap ring 180. Gears 170 and 172 are axially retained on their forward and rearward sides, respectively, by thrust bearings 182 and 184.

Blocker-clutch mechanism 30 includes the jaw clutch members 170a and 172a, a jaw clutch member or means 186 having internal jaw clutch splines 186a slideably splined to external splines on sleeve 178, a radially extending flange portion 186b integrally formed with member 186, three circumferentially positioned pins 188

(one of which is shown) extending parallel to the axis of shaft 20 and through holes 186c in flange portion 186b, two friction cone-clutch members 190 and 192 rigidly secured together by pins 188, two friction cone-clutch members 170c and 194 engageable with friction members 190 and 192 and each fixed for rotation with its respective gear, and three circumferentially positioned split pins 196 (one of which is shown) alternately spaced between pins 188 and extending parallel to the shaft 20 and through chamfered holes 186d in flange portion 186b.

Looking momentarily at both FIGS. 4 and 4A, each split pin includes a pair of semicylindrical halves 198 and 200 having a major diameter less than the I.D. of holes 186d when squeezed together, semiannular grooves 198a, and 200a with chamfered ends, and a leaf spring 202 for biasing the annular grooves apart to engage the groove chamfers with the hole chamfers. Halves 198 and 200 abut at their ends against end walls 190a and 192a of blind bores in friction members 190 and 192.

Looking momentarily at both FIGS. 4 and 4B, each hole 186c extends parallel to the axis of shaft 20 and includes oppositely facing square shoulders 186e and 186f positioned normal to the axis of shaft 20. Each pin 188 includes a major diameter 188a less than the I.D. of its respective hole 186c and a groove or reduced diameter portion 188b defining oppositely facing blocking shoulders 188c and 188d which are parallel to square shoulders 186e and 186f.

When blocker-clutch mechanism 30 is in the disengaged or neutral position, as shown, gears 170 and 172 are free to rotate relative to shaft 20. When it is desired to couple either gear to the shaft, actuator assembly 32 applies an actuating or engaging force to flange portion 186b to effect movement of jaw clutch member 186 toward the jaw clutch members 170a or 172a. If the engaging force is to the left, initial movement of the flange portion is transmitted through split pins 196 via leaf spring 202 and the chamfered shoulders to effect resilient engagement of friction members 190 and 170c. This resilient engagement (provided gear 170 and shaft 20 are rotating asynchronously) causes the reduced diameter portion 188b of pins 188 to move to one side of holes 186c, whereby square shoulders 186e engage blocking shoulders 188c to block engagement of jaw clutch member 186 with jaw clutch member 170a until gear 170 crosses synchronism with shaft 20. Since shoulders 186e and 188c are normal to the axis of shaft 20 and the direction of movement of jaw clutch member 186, the shoulders provide a positive or infinite block which is independent of the forces on the shoulders and the frictional torque between friction clutch members 190 and 170c, thereby preventing asynchronous engagement of the jaw clutch members should the design frictional torque between the friction members be slow in developing due to oil on the friction surfaces or should the design frictional torque fade due to a change in the coefficient friction of the surfaces.

Actuator assembly 32 includes a hydraulic actuator 204 and a spring box 206. Actuator 204 includes the cylinder housing 54 defined by rear housing member 40, cylindrical bore portions 208a, 208b, 208c, and 208d defined by a stepped bore 208 having shoulders 208e, 208f, and 208g, an end wall 210 abutting shoulder 208e and retained thereagainst by a snap ring 212, a piston rod 214 disposed in bore 208 for sliding movement parallel to the axis of shaft 20 and radially spaced therefrom, a piston 215 integrally formed with the piston rod for sliding movement in bore portion 208c, a piston 216 disposed for sliding movement within bore portion 208b and on piston rod 214, and a sleeve or stop member 217 slideably supported by piston rod 214 and interposed between the pistons. Piston rod 214 includes an end portion 214a slideably disposed in bore portion 208d for support purposes and an end portion 214b extending through end wall 210. Pistons 215 and 216 divide bore portions 208b and 208c into three fluid chambers. The mutually facing sides 215a and 216a of the pistons in part define a first fluid chamber 218 and the distal sides 215b and 216b of the pistons in part define second and third fluid chambers 220 and 222. Passages 224, 226, and 228 provide means for porting oil to and from the fluid chambers via the unshown control system. Conventional seals prevent oil leakage of the cylinder and by the pistons. The seals may be Quad-X Brand Seals obtainable from Minnesota Rubber Company.

Spring box 206 includes a sleeve 230 concentric to end portion 214b of the piston rod 214, annular bearing rings 232 and 234 slideably supporting the sleeve on the end portion, snap rings 236, 238, 240 and 242 defining stop means, a pre-loaded coil spring 244 interposed between the bearing rings and biasing the rings apart and into engagement with the stop means defined by the snap rings, and a shift fork 230a integrally formed with the sleeve. Shift fork 230a extends outward around the periphery of flange portion 186b and connects the flange portion to the sleeve in a conventional manner, as may be seen in FIG. 1. Bearing rings 232 and 234 are spaced apart as far as practicable to minimize shift fork cocking forces between the sleeve and end portion. Further, each ring includes concentric sleeve portions, such as sleeves 232a and 232b, which define an annular recess for receiving the spring ends and for increasing the outer and inner circumferential bearing surface of the rings, thereby lowering the surface forces on the bearings to reduce wear.

Figure 5:
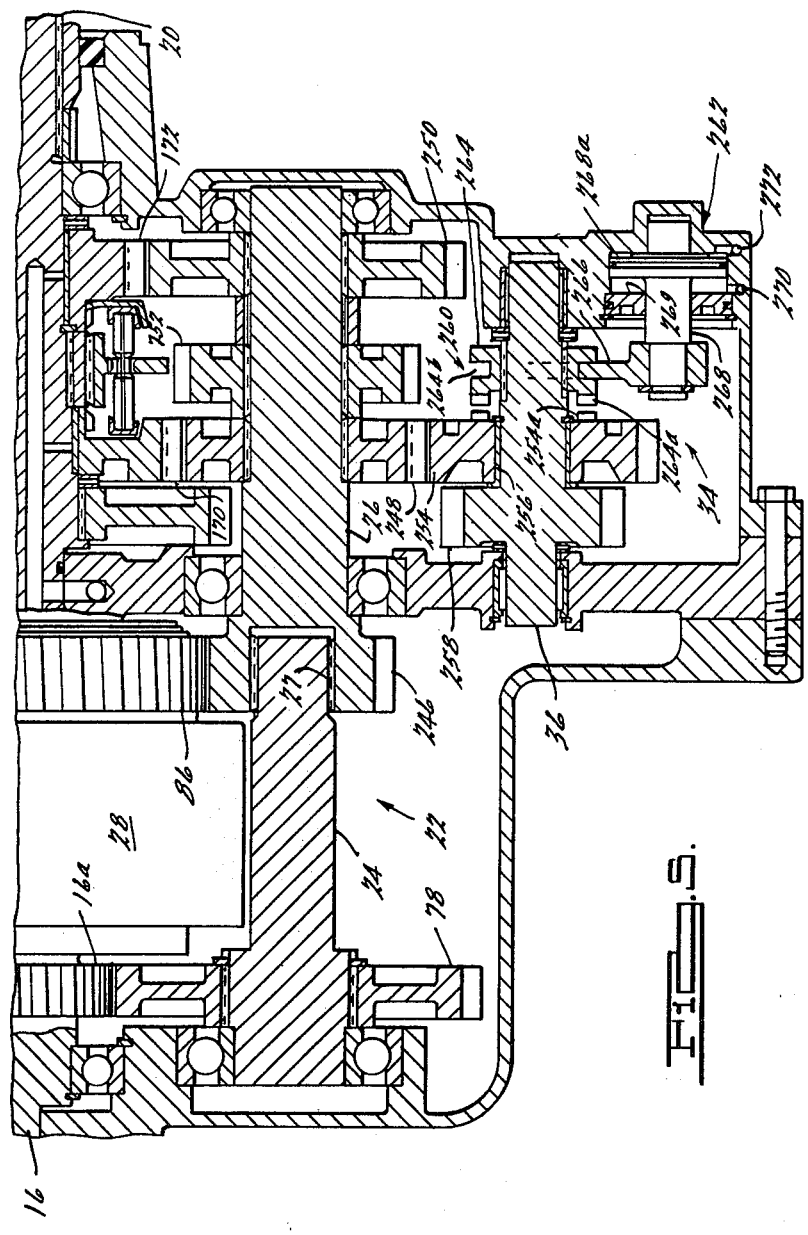
FIG. 5 is a fully sectioned view of another portion of the transmission ratio gearing, clutches, and an acutator.

Looking now at FIGS. 1 and 5 and in particular FIG. 5, countershaft assembly 22 includes the countershaft members 24 and 26, the gear 78 fixed for rotation with shaft 24 and in constant mesh with input gear 16a, the splined connection 27 connecting shaft 24 to shaft 26, gears 246, 248, and 250 fixed for rotation with shaft 26 and in constant mesh with gears 86, 170, and 172, respectively, and a power take-off gear 252 also fixed for rotation with shaft 26.

Reverse gear assembly 34 includes the idler shaft 36, a gear 254 supported for rotation about shaft 36 via a sleeve bearing 256 and in constant mesh with gear 248, a gear 258 fixed for rotation with shaft 36 and in constant mesh with the reverse speed ratio gear 168 when shaft 36 is in its true position as described in connection with housing assembly 12 and FIG. 2, a positive clutch assembly 260 for coupling gear 254 with shaft 36, and a hydraulic actuator 262 for selectively moving the clutch into and out of engagement.

Positive clutch 260 includes a set of jaw clutch teeth 254a defined by gear 254, a jaw clutch member 264 slideably splined to shaft 36, a set of jaw clutch teeth 264a defined by member 264 and engageable with teeth 254a, and an annular groove 264b which receives a shift fork 266.

Hydraulic actuator 262 includes a piston 268a formed with or fixed to a rod 268 and disposed in a cylinder defined by rear housing member 40, an end plate 269 for closing the cylinder, and the shift fork 266 fixed to rod 268. Hydraulic sealing of the piston and cylinder is provided by seals in a conventional manner. Passages 270 and 272 provide means for porting oil to and from the actuator via the unshown control system.

OPERATION

In reviewing the operation, it will be assumed that transmission 10 is installed in a land vehicle having an internal combustion engine coupled directly to shroud 64 of the torque converter, and that a shift control system will automatically effect shifting to the desired speed ratios in the proper sequence. Such control systems are well known and are often made responsive to parameters such as engine load and vehicle speed. It will also be assumed that the shift control system includes a shift control selector which is selectively placed in a neutral position to disengage the transmission, in a drive position to effect forward movement of the vehicle, and in a reverse position to effect reverse movement of the vehicle. However, the shift control selector could have four forward drive positions corresponding to the four forward speed ratios of the transmission; in which case, the shift control system could be made operative to engage only the ratio corresponding to the selector position or sequentially upshift and downshift between the low speed ratio and the highest ratio corresponding to the position of the selector. The shift control systems referred to herein are by way of example only and do not form part of the invention herein nor are they purported to be preferred forms of shift control systems.

In the following operational description, friction clutch 82 and 84 will be referred to as being either fully engaged or momentarily engaged. When fully engaged, the clutch locks-up. When momentarily engaged, the clutch slips. To implement the slipping, the control system pressure for engaging the clutch may be reduced and/or supplied for such a short period that full engagement or lock-up is not reached.

With the shift control lever in neutral and the engine running, input shaft 16 is driven by torque converter assembly 14; countershafts 24 and 26 are driven at a speed proportional to the speed of input shaft 16 via gears 16a and 78; ratio gears 86, 170, and 172 are driven at speeds proportional to their respective countershaft gears 246, 248 and 250; and the control system ports pressurized oil to chambers 220 and 222 of hydraulic actuator 204 to position rod 214 in the neutral position as shown in the drawings. Further, output shaft 20 is completely disconnected from input shaft 16 and countershafts 24 and 26 since friction clutches 82 and 84, blocker-clutch assembly 30, and positive clutch 260 are all disengaged.

Assume now that a vehicle operator places the shift control lever in the drive position and wishes to accelerate the vehicle in a forward direction to a speed which will cause the control system to sequentially power upshift through each of the four forward drive ratios of the transmission. When the shift lever is placed in drive, the control system fully engages friction clutch 84 by porting pressurized oil to chamber 140 thereby squeezing friction disks 134 and 136 together and connecting gear 86 to output shaft 20 via housings 130 and 88 of clutches 84 and 82, respectively.

When the sensed parameters indicate upshifting from the low speed ratio, the control system will operate to effect a power upshift from the low speed ratio provided by gear 86 to the first intermediate speed ratio provided by gear 170. To wit, the control system simultaneously ports chamber 140 to return to disconnect gear 86 from shaft 20, ports pressurized oil to chamber 96 to momentarily engage clutch 82 and connect input shaft 16 directly to output shaft 20 for bringing gear 170 toward synchronism with shaft 20, and continues to port pressurized oil to chamber 222 of hydraulic actuator 204 while porting chamber 220 of the actuator to return to move rod 214 leftward. The rate of oil pressure buildup and release in chambers 96 and 140, respectively, is controlled to effect a smooth transition of driving torque from clutch mechanism 84 to clutch mechanism 82. While the driving torque through clutch mechanisms 82 and 84 is increasing and decreasing, respectively, the pressurized oil in chamber 222 acts on distal side 215b of piston 215 and moves piston 215, rod 214, spacer 217, and piston 216 leftward toward contact with end wall 210 by piston 216. Initial movement of rod 214 is transmitted to flange portion 186b of blocker-clutch assembly 30 via coil spring 244 of spring box 206. This initial movement resiliently moves friction clutch member 190 into engagement with friction clutch member 170a via leaf springs 202 and the chamfered shoulders of split pins 196. During normal operating conditions, friction clutch members 190 and 170a will engage before clutch mechanism 82 can bring shaft 20 into synchronism with gear 170. Hence, the reduced diameter portion of pins 188 will move to one side of holes 186c and shoulders 186e and 188c will engage and block engagement of jaw clutch member 186 with jaw clutch member 170a. The blocking action of shoulders 186e and 188c arrests further movement of shift fork 230a and sleeve 230. However, piston rod 214 continues to move leftward until piston 216 contacts end wall 210, thereby compressing coil spring 244 of spring box 206 and resiliently loading square shoulders 186e against blocking shoulders 188c. The blocking action of shoulders 186e and 188c continues until clutch 82 causes gear 170 to cross synchronism with shaft 20. As synchronism is crossed, pins 188 move into axial alignment with holes 186c, thereby allowing the compressed force of spring 244 to quickly move or snap sleeve 230, shift fork 230a, and flange portion 186b leftward and carry jaw clutch member 186 into engagement with jaw clutch member 170a. While the jaw clutch members are engaging, the control system effects an unrestricted porting of chamber 96 to return to quickly disengage clutch mechanism 82. The signal to effect a timely porting of chamber 96 to return may be provided by an unshown position indicator which senses the leftward movement of either sleeve 230, fork 230a, flange 186b, or jaw clutch member 186. Position indicators of this type are well known in the art.

The blocker-clutch and spring box arrangement enhances the transmission control and operation in several ways. For example, since the force for shifting jaw clutch member 186 is resiliently stored in coil spring 244 of the spring box, control system timing for porting fluid to actuator 204 need not be as precise as it would need be if the actuator were moving the jaw clutch member directly. Since the force for shifting the jaw clutch member is resiliently stored in the coil spring, the pressure of the oil ported to the actuator need not be precisely controlled. Further, since only sleeve 230 and shift fork 230a move to engage the jaw clutch member when synchronism is reached, the mass of the moving parts is reduced, whereby the jaw clutch member is moved faster with a given force and whereby impulse forces are maintained relatively low.

When the sensed parameters indicate upshifting from the first intermediate speed ratio, the control system will operate to effect a power upshift from the first intermediate speed ratio provided by gear 170 to the second intermediate speed ratio provided by gear 172. To effect the power shift out of the first intermediate speed ratio, torque on the splines of jaw clutch members 170a and 186 must be relieved. When the engine is driving the vehicle wheels, the torque (hereinafter called "driving torque") is relieved by momentarily engaging friction clutch 82. However, when the wheels are driving the engine, the torque (hereinafter called "coast mode torque") is merely increased by momentarily actuating friction clutch 82. To relieve the coast mode torque, the control system may be programmed to always momentarily engage friction clutch 84 prior to momentary engagement of friction clutch 82 or to only momentarily engage friction clutch 84 prior to momentary engagement of friction clutch 82 when the engine power control is less than a predetermined amount, e.g., a 20 percent power position. To effect the shift, the control system simultaneously ports chamber 222 of actuator 204 to return, ports pressurized oil to chamber 218 to apply a rightward force on flange portion 186b via spring 244 of the spring box, momentarily ports pressurized oil to chamber 140 of friction clutch 84 to relieve coast mode torque, and then momentarily ports pressurized oil to chamber 96 of friction clutch 82 while porting chamber 140 to return. Momentary engagement of clutch 82 relieves any driving torque and allows disengagement of jaw clutch member 186 from jaw clutch member 170a and then brings the speed of gear 172 down to synchronism with output shaft 20. While clutches 82 and 84 are relieving the torque on the splines of the jaw clutch members, the pressurized oil in chamber continues to act on mutually facing side 215a of piston 215, thereby moving rod 214 rightward until piston 215 contacts shoulder 208g. The initial rightward movement of rod 214 compresses coil spring 244 and applies a shifting force which snaps jaw clutch member rightward out of engagement with jaw clutch 170a in response to clutches 82 and 84 relieving the torque on the splines. As flange portion 186b moves rightward, it passes through neutral and the chamfered shoulders of split pins 196 engage the chamfered shoulders of holes 186d, thereby effecting a resilient engagement of friction clutch member 192 with friction clutch member 194 via the force of spring 202.

During normal operating conditions, friction clutch members 192 and 194 will engage before clutch mechanism 82 can bring shaft 20 into synchronism with gear 172. Hence, the reduced diameter portion of pins 188 will move to one side of holes 186c and shoulders 186f and 188d will engage and block engagement of jaw clutch member 186 with jaw clutch member 172a. The blocking action of shoulders 186f and 188d arrests further rightward movement of shift fork 230a and sleeve 230. However, piston rod 214 is free to continue its rightward movement until piston 215 contacts shoulder 208g, thereby compressing coil spring 244 of spring box 206 and resiliently loading square shoulders 186f against blocking shoulders 188d. The blocking action of shoulders 186f and 188d continues until clutch 82 brings gear 172 across synchronism with shaft 20. As synchronism is crossed, pins 188 move into axial alignment with holes 186c, thereby allowing the compressed force of spring 244 to quickly snap jaw clutch member 186 into engagement with jaw clutch member 172a. While the jaw clutch members are engaging, the control system effects an unrestricted porting of chamber 96 to return to quickly disengage clutch mechanism 82. The signal to effect a timely porting of chamber 96 to return may be provided by the unshown position indicator previously mentioned.

When the sensed parameters indicate upshifting from the second intermediate speed ratio, the control system will operate to effect a power upshift from the second intermediate speed ratio provided by gear 172 to the high or direct drive ratio provided by connecting input shaft 16 directly to output shaft 20 via clutch mechanism 82. To wit, the control system simultaneously ports pressurized oil to chambers 220 and 222 of actuator 204, ports chamber 218 of the actuator to return, momentarily ports pressurized oil to chamber 140 to relieve coast mode torque, and then ports pressurized oil to chamber 96 to fully engage clutch mechanism 82 and relieve any driving torque while porting chamber 140 to return. While clutches 82 and 84 are relieving the torque on the splines of jaw clutch members 186 and 172a, the pressurized oil in chambers 220 and 222 acts on the distal sides of pistons 216 and 215 and moves 216 rightward to its neutral position against the stop defined by shoulder 208f and moves piston 215 leftward to its neutral position against the stop defined by sleeve 217. Further leftward movement of piston 215 and rod 214 is arrested since the area of distal side 216b of piston 216 is greater than the area of distal side 215b of piston 215. The initial leftward movement of rod 214 begins to compress coil spring 244 of spring box 206 and thereby applies an increasing shifting force to flange 186b for snapping jaw clutch member 186 leftward out of engagement with jaw clutch member 172a when the torque on the splines of jaw clutch members 186 and 172a is relieved by clutches 82 and 84.

Assuming now that the sensed parameters indicate downshifting from the high speed ratio, the control will operate to effect a power downshift from the high speed ratio provided by friction clutch 82 to the second intermediate speed ratio provided by gear 172. To wit, the control system simultaneously ports chamber 96 of clutch 82 to return, ports pressurized oil to chamber 140 of clutch 86 to momentarily connect output shaft 20 to the countershaft via the low speed ratio gear to bring gear 172 up toward synchronism with output shaft 20, ports pressurized oil to chamber 218 of hydraulic actuator 204, and ports chamber 222 of the actuator to return. As described with respect to upshifting, the rate of oil flow to and from chambers 140 and 96, respectively, is controlled to effect a smooth transition of driving torque from clutch mechanism 82 to clutch mechanism 84. While the driving torque through clutch mechanisms 84 and 82 is increasing and decreasing, respectively, the pressurized oil in chamber 218 acts on mutually facing side 215a of piston 215 and moves piston 215 and rod 214 rightward toward contact with shoulder 208g. Initial movement of rod 214 is transmitted to flange portion 186b of blocker-clutch assembly 30 via coil spring 244 of spring box 206. This initial movement resiliently moves friction clutch member 192 into engagement with friction clutch member 194 via leaf spring 202 and the chamfered shoulders of split pins 196. During normal operating conditions, friction clutch members 192 and 194 will engage before clutch mechanism 84 can bring gear 172 up to synchronism with shaft 20. Hence, the reduced diameter portion of pins 188 will move to one side of holes 186c and shoulders 186f and 188d will engage and block engagement of jaw clutch member 186 with jaw clutch member 172a. The blocking action of shoulders 186f and 188d arrests further movement of shift fork 230a and sleeve 230. However, piston rod 214 continues to move rightward until piston 215 contacts shoulder 208g, thereby compressing coil spring 244 of spring box 206 and resiliently loading square shoulders 186f against blocking shoulders 188d. The blocking action of shoulders 186f and 188d continues until clutch 84 causes gear 172 to cross synchronism with shaft 20. As synchronism is crossed, pins 188 move into axial alignment with holes 186c, thereby allowing the compressed force of spring 244 to quickly snap jaw clutch member 186 leftward into engagement with jaw clutch member 172a. While the jaw clutch members are engaging, the control system effects an unrestricted porting of chamber 140 to return to quickly disengage clutch mechanism 84. The signal to effect the timely porting of chamber 140 to return may be provided by the unshown position indicator previously mentioned during the upshifting description.

When the sensed parameters indicate downshifting from the second intermediate speed ratio, the control system will operate to effect a power downshift from the second intermediate speed ratio provided by gear 172 to the first intermediate speed ratio provided by gear 170. As in upshifting, driving and coast mode torque on the splines must be relieved. To effect the shift and relieve the torque, the control system continues to port pressurized oil to chamber 220 of actuator 204, ports chamber 222 of the actuator to return, momentarily ports pressurized oil to chamber 96 to relieve driving torque on the splines of jaw clutch members 186 and 172a, and then momentarily ports pressurized oil to chamber 140 of friction clutch 84 (while porting chamber 96 to return) to relieve any coast mode torque and to bring the speed of gear 170 up to synchronism with output shaft 20 after jaw clutch member 186 disengages from jaw clutch member 172a. Further operation to complete the shift is analogous to the operation previously described.

When the sensed parameters indicate downshifting from the first intermediate speed ratio, the control system will operate to effect a power downshift from the first intermediate speed ratio provided by gear 170 to the low speed ratio provided by fully engaging friction clutch 84. To effect the shift and relieve the torque on the splines of jaw clutch member 186 and 170a, the control system ports pressurized oil to chamber 222 of actuator 204, ports chamber 220 to return, momentarily ports pressurized oil to chamber 96 to relieve driving torque on the splines, and then ports pressurized oil to chamber 140 to fully engage friction clutch 84 (while porting chamber 96 to return) to relieve any coast mode torque. Further operation to complete the shift is analogous to the operation previously described.

DESCRIPTION OF FIG. 6

Figure 6:
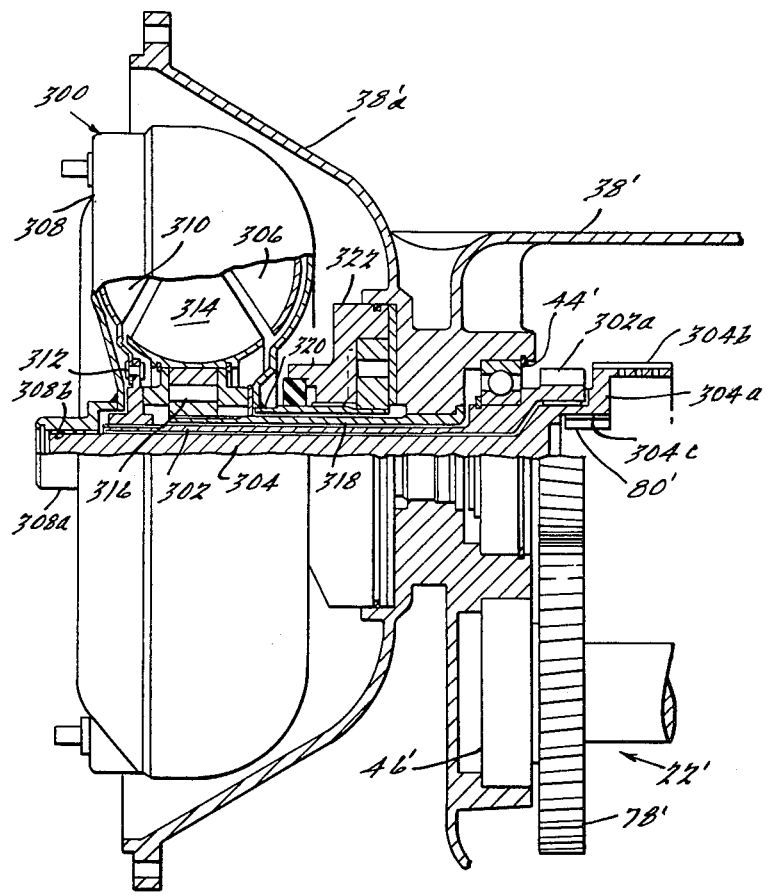
FIG. 6 is an alternative embodiment of the transmission torque converter and input shaft.

Looking now at FIG. 6, therein is shown an alternative embodiment of the transmission torque converter and input shaft which provides the transmission with an automatic torque converter bypass when the transmission is in the direct or the fourth speed drive ratio. In describing the embodiment of FIG. 6, elements therein which are identical to elements in FIGS. 1–5 will have the same reference numerals but suffixed with a prime. The alternative embodiment includes a torque converter assembly 300 disposed in bell housing portion 38a', a sleeve shaft or torque converter driven shaft 302 rotatably supported in front housing member 38' by bearing 44', and a bypass shaft 304 rotatably supported within sleeve shaft 302.

The torque converter assembly 300 includes an impeller 306 driven by a shroud 308, a turbine 310 hydraulically driven by the impeller and in turn drivingly fixed to sleeve shaft 302 at 312, and a runner or stator 314 which becomes grounded to housing member 38' via a one-way roller clutch 316 carried by a sleeve 318 fixed to the housing member. The rear side of shroud 308 is fixed to a sleeve 320 which rotatably supports the rear of the shroud and drives a pump 322. Pump 322 may be a well known crescent gear pump for pressurizing the torque converter, for lubricating the transmission, and for providing pressurized oil to engage friction clutches and actuators in the transmission. The front side of shroud 308 includes a cup-shaped portion 308a having internal splines 308b.

Torque converter driven shaft 302 is integrally formed with a gear 302a analogous to gear 16a and in constant mesh with countershaft gear 78', whereby countershaft assembly is driven by the torque converter as in FIGS. 1–5. Bypass shaft 304 is drivingly connected to shroud 308 via splines 308b and is integrally formed with an annular flange portion 304a having external splines 304b analogous to splines 16d for driving the friction disks of the direct drive clutch mechanism, and a recess 304c carrying bearing 80' for rotatably supporting the front end of the output shaft, not shown in FIG. 6. Hence, engagement of clutch mechanism 82' automatically bypasses the torque converter with its inherent inefficiency and negates the need for a separate torque converter bypass clutch which would add to the size and weight and complexity of the transmission and its control system.

The preferred embodiments of the invention have been disclosed for illustrative purposes. Many variations and modifications of the preferred embodiment are believed to be within the spirit of the invention. For example, the blocker-clutch assembly 30 may be replaced with blocker-clutch assemblies such as disclosed in U.S. Pat. No. Re. 29,601; U.S. Pat. Nos. 3,910,131; and 3,983,979 which are incorporated herein by reference. Also, the power downshift arrangement may be dispensed with in favor of driver manipulation of engine speed to relieve torque on the splines of the jaw clutch members and provide synchronism therebetween. The following claims are intended to cover the inventive portions of the preferred embodiment and variations and modifications within the spirit of the invention.

What is claimed is:

1. In a transmission of the type including a housing; an input shaft and an output shaft mounted for rotation in the housing; a countershaft mounted for rotation in the housing and disposed parallel to the other shafts; and ratio change means connectable between said input and output shafts to provide at least low, intermediate and high speed ratio changes between the input and output shafts; the improvement wherein the ratio change means comprises:

low and intermediate speed ratio gears mounted for rotation about one of said shafts and operative when coupled to said one shaft to provide said low and intermediate speed ratios between said input and output shafts via said countershaft;

first and second jaw clutch members operative when engaged to couple said intermediate gear to said one shaft, said members normally rotating at different speeds during transmission upshifting and downshifting into said intermediate gear;

a first friction clutch operative when engaged to frictionally interconnect said input and output shafts, said first friction clutch fully engageable to couple said low speed ratio gear directly to said one shaft and momentarily engageable during downshifting into said intermediate speed ratio to momentarily connect said low speed ratio gear directly to said one shaft to synchronize said members for engagement; and a second friction clutch operative when engaged to frictionally interconnect said input and output shafts, said second friction clutch fully engageable to couple said input shaft directly to said output shaft to provide said high speed ratio and momentarily engageable during upshifting into said intermediate speed ratio to momentarily connect said input shaft directly to said output shaft to synchronize said members for engagement, and said first and second friction clutches being disengaged when said input and output shafts are interconnected by said intermediate speed ratio.

2. The improvement of claim 1, wherein said countershaft is in constant driving relation with said input shaft; and said low and intermediate speed ratio gears are mounted for rotation about said output shaft.

3. The improvement of claim 1 or 2, wherein said second friction clutch includes a housing member fixed for rotation with said output shaft and a set of friction disks alternately splined to said input shaft and said housing member and operative when squeezed together to frictionally connect said input shaft to said output shaft via said housing member; and said first friction clutch includes a housing member fixed for rotation with said low speed ratio gear and mounted for rotation about said output shaft, and a set of friction disks alternately splined to said housing members and operative when squeezed together to frictionally connect said low speed ratio gear to said output shaft via said housing members.

4. In a powershift transmission of the type including a housing; an input shaft, an output shaft, and at least one countershaft; at least low, intermediate, and high speed ratios means associated with the shafts and selectively connectable between the input and output shafts; the improvement comprising:

a jaw clutch means associated with the intermediate speed ratio means and operative when engaged to interconnect the input and output shafts via the intermediate speed ratio means;

a first friction clutch associated with the low speed ratio means, said first friction clutch fully engageable to interconnect the input and output shafts via the low speed ratio, and said first friction clutch momentarily engageable during downshifting into the intermediate speed ratio to momentarily connect said low speed ratio gear directly to said one shaft to synchronize said members for engagement; and a second friction clutch associated with the high speed ratio means, said second friction clutch fully engageable to interconnect the input and output shafts via the high speed ratio means, said second friction clutch momentarily engageable during upshifting into the intermediate speed ratio to partially connect said input shaft directly to said output shaft to synchronize said jaw clutch for engagement, and said first and second friction clutches being disengaged when said input and output shafts are interconnected by said intermediate speed ratio.

5. A powershift transmission comprising:
a housing;
input drive means, an output shaft, and at least one countershaft mounted for rotation in said housing, said countershaft in constant driving relation with said input drive means;
low and intermediate speed ratio means, each ratio means including a gear pair in constant mesh, one gear of each pair permanently fixed to one of said shafts and the other gear of each pair rotatably mounted on said other shaft;
a jaw clutch means operative when engaged to connect said rotatably mounted intermediate speed ratio gear to said other shaft;
a first friction clutch operative when engaged to connect said rotatably mounted low speed ratio gear to said other shaft independent of said intermediate speed ratio gear pair and said jaw clutch;
a second friction clutch operative when engaged to interconnect said input drive means with said output shaft for providing a high speed ratio independent of said other speed ratio means and said other clutches, and said first and second friction clutches being disengaged when said jaw clutch means is engaged.

6. A powershift transmission comprising:
a housing;
input drive means, an output shaft, and at least one countershaft mounted for rotation in said housing, said countershaft in constant driving relation with said input drive means;
low, and first and second intermediate speed ratio means, each ratio means including a gear pair in constant mesh, one gear of each pair permanently fixed to one of said shafts and the other gear of each pair rotatably mounted on said other shaft;
jaw clutch means disposed between said rotatably mounted first and second intermediate speed ratio gears for selectively connecting said rotatably mounted first and second intermediate ratio gears to said other shaft;
a first friction clutch operative when engaged to connect said rotatably mounted low speed ratio gear to said other shaft independent of said first and second intermediate speed ratio gear pairs and said jaw clutch means; and
a second friction clutch operative when engaged to interconnect said input drive means with said output shaft for providing a high speed ratio independent of said other speed ratio gear pairs and said other clutches, and said first and second friction clutches being disengaged when said jaw clutch means connects either of said rotatably mounted first and second intermediate ratio gears to said other shaft.

7. The improvement of claim 4, 5, or 6, wherein said jaw clutch includes:
blocker means for preventing asynchronous engagement of the jaw clutch means.

8. The transmission of claim 5 or 6, wherein said input drive means includes:
   a fluid coupling having an input directly connectable to a source of power and an output in constant driving relation with said countershaft; and
   a bypass shaft having an input directly connectable to said source of power and an output connectable to said output shaft via said second friction clutch to provide said high-speed ratio.

9. The transmission of claim 5 or 6, wherein said first friction clutch is momentarily engagable during downshifting into said intermediate speed ratio to synchronize said jaw clutch means for engagement, said second friction clutch is momentarily engagable during upshifting into said intermediate speed ratio to synchronize said jaw clutch means for engagement, and further including:
   blocker means for preventing asynchronous engagement of said jaw clutch means.

10. The transmission of claim 9, wherein said input drive means includes:
    a fluid coupling having an input directly connectable to a source of power and an output in said constant driving relation with said countershaft; and
    a bypass shaft having an input directly connectable to said source of power and an output connectable to said output shaft via said second friction clutch to provide said high-speed ratio.

* * * * *